455/6

Oct. 31, 1967 R. P. GABRIEL ET AL 3,350,647

WIRED BROADCASTING SYSTEMS AND COMMUNICATION CABLES THEREFOR

Filed Oct. 21, 1963 2 Sheets-Sheet 1

B 10-25-62

INVENTORS
Ralph P. Gabriel, Rupert I. Kinross
BY
Richard Lord
Agt

WIRED BROADCASTING SYSTEMS AND COMMUNICATION CABLES THEREFOR

Filed Oct. 21, 1963 2 Sheets-Sheet 2

INVENTORS
Ralph P. Gabriel, Rupert I. Kinross
BY
Richard Lord
Ag't

United States Patent Office 3,350,647
Patented Oct. 31, 1967

3,350,647

WIRED BROADCASTING SYSTEMS AND COMMUNICATION CABLES THEREFOR

Ralph P. Gabriel, Chobham, Surrey, and Rupert I. Kinross, Shepperton, Middlesex, England, assignors to Communications Patents Limited Filed Oct. 21, 1963, Ser. No. 317,608
Claims priority, application Great Britain, Oct. 25, 1962, 40,403/62
4 Claims. (Cl. 325—308)

Figure 1:
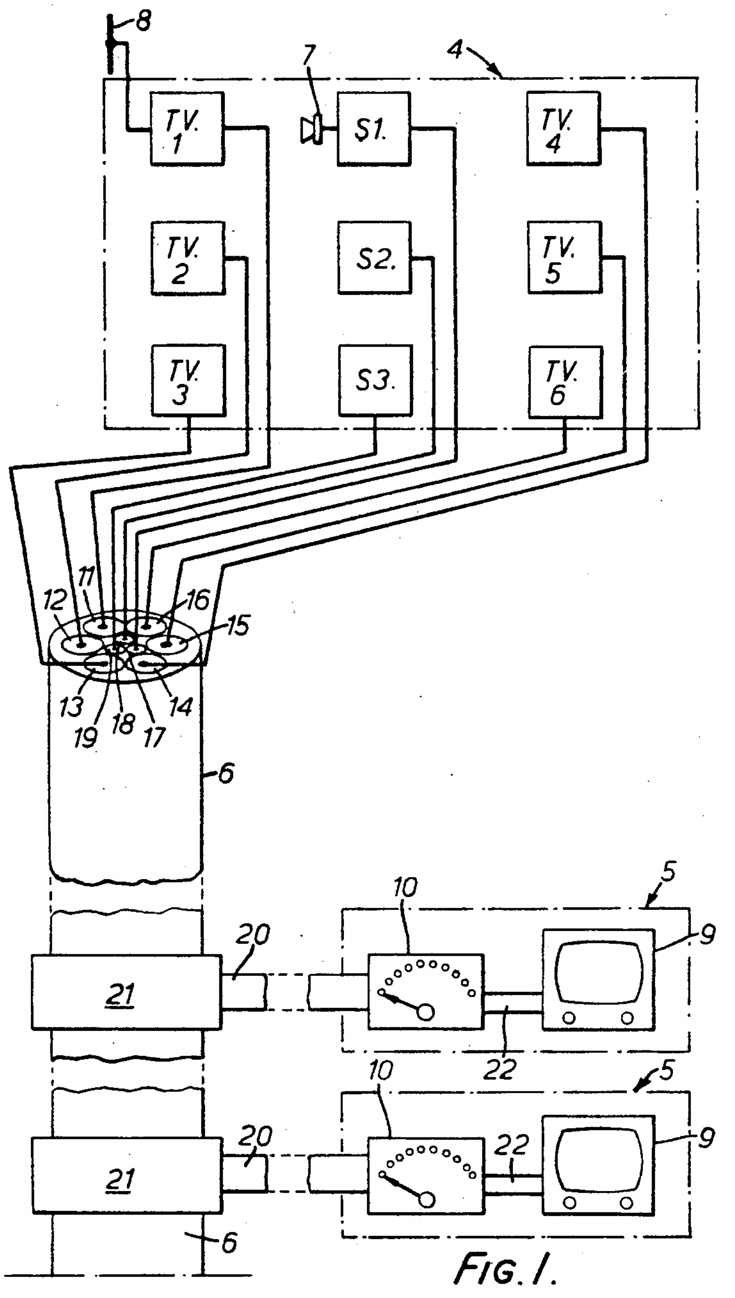

This invention is concerned with wired broadcasting systems and electric wave communication cables therefor. In such systems it is often required to distribute electric wave signals in respect of a plurality of different sound and television programmes and for this purpose it is known to form a signal-distributing network of the system with multi-pair cable, that is to say a cable which provides a plurality of separate lines each being formed by twin conductors. An object of this invention is to provide improved systems and cables of this kind whereby a high degree of immunity from crosstalk or crossview can be obtained whilst keeping the overall diameter of the cable at a minimum.

From one aspect the invention provides a wired broadcasting system wherein the signal-distributing network between transmitting equipment and a plurality of subscriber's equipments provides facilities for the distribution of audio frequency signals in respect of a plurality of different television programmes and is characterised in that it comprises a cable in which a plurality of pairs of twisted together insulated conductors which serve for the transmission of the high frequency television signals are arranged in a compact symmetrical group, about a centre core element, and the conductors of pairs of conductors which serve for the transmission of the said audio frequency signals are arranged within the configuration of this group.

From another aspect the invention provides an electric wave communication cable, suitable for use in the signal distributing network of a wired broadcasting system, wherein a plurality of pairs of twisted together insulated conductors are arranged in a compact symmetrical group about a centre core element, each such pair having electrical characteristics which render it suitable for the transmission of high frequency signals, and the conductors of a plurality of pairs of conductors suitable for the transmission of audio frequency signals are arranged within the configuration of this group. The cable so provide can have an overall diameter which is no greater than would be necessary to accommodate the group of high frequency pairs alone.

In one embodiment of the invention the said centre core element comprises a plurality of twisted together pairs of conductors, each pair being suitable for the transmission of audio frequency signals. For example, in one such arrangement three pairs of twisted together insulated conductors are provided to form a group of twisted together pairs the circumscribing cylinder of which has a diameter which corresponds to that of the circumscribing cylinder of each of six pairs of twisted together insulated conductors which are suitable for the transmission of the high frequency signals and are arranged in mutual contact about this twisted together group.

In another embodiment of the invention a conductor, of a pair of conductors, is accommodated in each of the interstices of a pair of the twisted together insulated conductors suitable for the transmission of the high frequency signals, the conductors so accommodated constituting a pair which is suitable for the transmission of audio frequency signals. Advantageously, the overall diameter of each of these audio frequency conductors, including its insulation if any, is not more than two thirds of the overall diameter of each of the insulated high frequency conductors so that all four conductors of the two pairs are contained in the circumscribing cylinder of the twisted together pair which is suitable for the transmission of the high frequency signals. Six such twisted together pairs of conductors suitable for transmission of the high frequency signals can be grouped to obtain the most compact symmetrical configuration about a centre core element and although it might be possible to provide each such high frequency pair with an associated audio frequency pair it is thought to be advantageous to provide only alternative ones of the high frequency pairs with such audio frequency pairs. The centre core element of such an arrangement can for example comprise a twisted together pair of insulated conductors similar to each of the six high frequency pairs but advantageously this centre pair is reserved for audio frequency signals, this particular arrangement thus providing a cable which has six high frequency channels for use in respect of six different television programmes and four audio frequency channels for use in respect of four different sound programmes.

Figure 2:
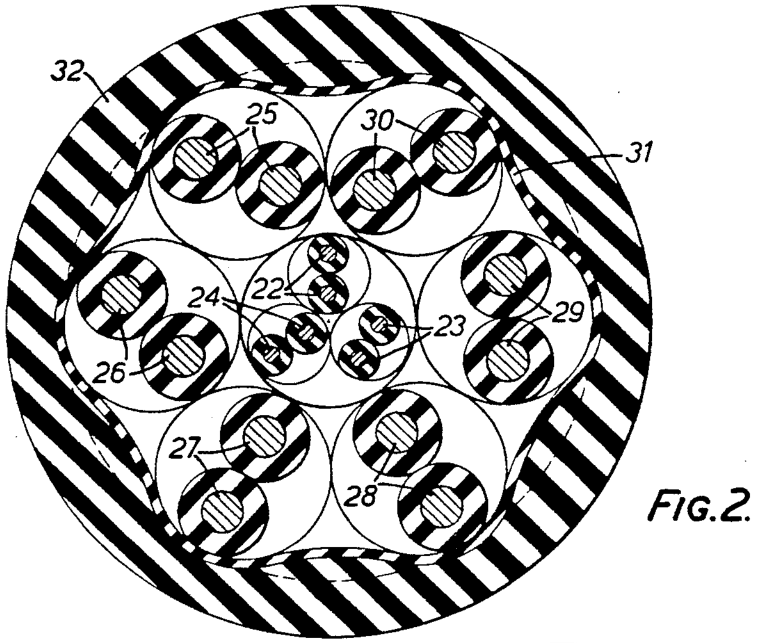
Figure 3:
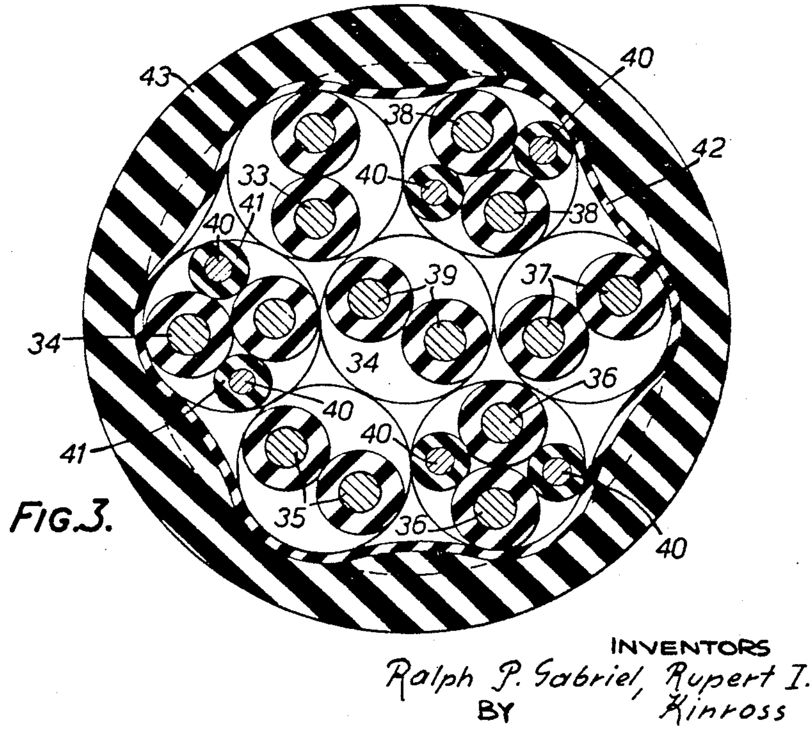

In order that the invention more readily can be understood it will now be described, by way of example only, with reference to the accompanying drawings in which:

FIG. 1 is a block schematic diagram of a wired broadcasting system according to the invention, FIG. 2 is a cross-sectional view showing the arrangement of the conductors of an electric communication cable in accordance with one embodiment of the invention, and FIG. 3 is a cross-sectional view showing the arrangement of the conductors of an electric communication cable in accordance with another embodiment of the invention.

The wired broadcasting system shown in FIG. 1 comprises a transmitting station 4, a plurality of receiving stations 5, and a signal distributing network which extends between the transmitting station and each of the receiving stations and comprises a multi-line cable 6.

The equipment of the transmitting station includes three audio frequency electric wave amplifiers, S1, S2 and S3, each of which pertains to a different sound programme. For example, the amplifier S1 is shown as receiving an input from a local studio mircophone 7 whilst the amplifiers S2 and S3 may be arranged to receive signals in respect of different programmes by way of land line or radio circuits which carry these signals from microphones located at remote places.

The transmitting equipment also includes six sets of high frequency electric wave apparatus, namely TV1 . . . TV6, each of which pertains to a different television programme. The input to each of these high frequency apparatus is obtained in any desired suitable way, for example, the apparatus TV1 is shown to have associated therewith an antenna 8 destined to receive radio signals in respect of a television programme originating from a remote source. Each of the five remaining sets of high frequency apparatus can be similarly provided with a receiving antenna in respect of different television programmes but in some cases the input signals for one or more of these sets of apparatus may be obtained by way of land lines, for example over co-axial cable circuits. Each of these high frequency apparatus includes a modulating means, whereby a carrier wave is modulated by the video signals of the television programme concerned, and a high frequency amplifying means which serves to produce an amplified version of the modulated carrier wave obtained from the modulating means for application to a separate one of the high frequency pairs of the cable network. The frequencies of the carrier waves employed preferably come within the range 4–10 mc./s.

Each receiving station comprises subscriber's equipment which includes a combined television and sound programme receiver 9 and a personally operable programme selection switch 10.

The cable 6 of the signal distributing network comprises six pairs of conductors, which pairs are indicated diagrammatically by the six rings 11 . . . 16, and each of these is coupled electrically with the output circuit of a separate one of the high frequency apparatus TV1 . . . TV6. The arrangement of these high frequency pairs of conductors will be described hereinafter. This cable 6 also comprises, in this particular example as a centre core element for the high frequency pairs 11 . . . 16, three pairs of conductors suitable for the transmission of audio frequency signals. These three audio frequency pairs are indicated by the rings 17, 18 and 19 and each is connected electrically with the output circuit of a separate one of the audio frequency amplifiers S1, S2 and S3.

The signals pertaining to the sound accompaniment of each television programme are distributed, in well known manner, over the same signal path as the corresponding high frequency picture signals and it is deemed unnecessary to include in this description any further details relative thereto.

It is convenient at this stage of the description to mention that in preferred embodiments alternative ones of the high frequency pairs of the network have applied thereto carrier waves having the same frequency and adjacent high frequency pairs have applied thereto carrier waves having different frequencies. One advantage of this arrangement is the fact that only two carrier frequencies need to be involved in the distribution over the network of signals in respect of six television programmes with consequent simplification of transmission and receiving equipments. Thus the carrier wave used in respect of each of the high frequency apparatus TV1, TV3 and TV5 can have the same frequency and the signals are applied to the alternative high frequency pairs, 11, 13 and 15 respectively. Likewise the carrier wave used in respect of each of the high frequency apparatus TV2, TV4 and TV6 can have another common frequency and the signals are applied to the high frequency pairs 12, 14 and 16 respectively. A single oscillator can be used for the purpose of producing the three carrier waves of common frequency and accordingly only two basic oscillators are required for the station equipment. In practice it has been found advantageous to arrange for the frequency difference of the two carrier wave frequencies to be substantially an odd multiple of half the line frequency of the television standard concerned or in some cases an odd multiple of one third of this the frequency. It will therefore be seen that alternate high frequency pairs of the network pertain to the same carrier frequency and adjacent high frequency pairs to different carrier frequencies. With this arrangement, aided by the fact that each of the high frequency pairs is a twisted pair and each pair is twisted according to a different pitch, desirable low mutual coupling between adjacent pairs is obtained The cable 6 can be considered as a main feeder cable of the system and similar but smaller gauge cables are used as branch cables for leading in to the receiving stations. Two such branch cables, 20, are shown in the drawing and each extends between a separate junction point, 21, and the programme selection switch 10 of a separate receiving station. By operating the switch 10 a subscriber can at will connect electrically, by way of a coupling link 22, any one of the high frequency pairs or any one of the audio frequency pairs of the cable network with the input circuit or circuits of the combined television and sound receiver 9 for the purpose of receiving the television or sound programme pertaining to the selected pair.

Although it has been mentioned hereinbefore that the audio frequency pairs 17, 18 and 19 form a central core for the group of high frequency pairs 11 . . . 16, the audio pairs can in come cases be arranged in some other manner such that they are within the configuration of the symmetrical group of high frequency pairs and the overall diameter of the cable is not greater than would be necessary to accommodate the six high frequency pairs alone. An example of such an alternative arrangement will be described hereinafter in greater detail.

Preferred forms of electric wave communication cables suitable for use in establishing such a wired broadcasting network are shown in FIGS. 2 and 3. The first of these two embodiments has a centre core element which comprises three pairs, 22, 23 and 24, of twisted together insulated conductors, each pair being twisted according to a different pitch and the three pairs arranged as a twisted together (spiralled) group. These three pairs have electrical characteristics which render them suitable for the transmission of audio frequency signals and can be used to constitute the audio pairs 17, 18 and 19 of the distribution network shown in FIG. 1. Around this centre core element there is arranged, as a compact symmetrical group, six pairs, 25 . . . 30, of twisted together insulated conductors, each pair being twisted according to a different pitch. Each of these six pairs has electrical characteristics which render it suitable for the transmission of high frequency signals (say up to 15 mc./Xs.) and can be used to constitute the high frequency pairs 11 . . . 16 respectively of the network of the system shown in FIG. 1. The circumscribing cylinder of each of these high frequency pairs has the same diameter as that of the circumscribing cylinder of the group of audio pairs 22, 23 and 24. In one example of such a cable the audio pairs comprise conductors of 0.020" diameter plain copper (6½ lb. wire) each sheathed with a 0.0065" radial thickness of polythene such that the twisted pair has a characteristic impedance of approximately 110 ohms. The group of six high frequency pairs is spiralled about the centre element and the whole symmetrical assembly is wrapped with a layer 31 of suitable insulating material, such for example as one or more strips of polyethylene terephthalate. This wrapped assembly is enclosed within a polythene sheath 32. In an alternative form of such a cable (not shown) a conductive screen is provided around the wrapped assembly. Such a screen may be formed in known manner by a helical or longitudinal tape of conductive material such, for example, as an aluminium or copper tape. This screen is located between a layer of polythene which surrounds the wrapped assembly and an outer sheath of polythene. In the case of a screened cable the outer sheath of polythene can have an average radial thickness of about 0.03" but in the case of an unscreened cable the polythene sheath preferably has an average radial thickness of about 0.06" this thicker sheath serving to minimise changes in the attenuation of the cable under varying atmospheric conditions. In an alternative example of such a cable, suitable as a branch cable, the audio pairs comprise conductors of 0.0164" diameter plain copper (4 lb. wire) each sheathed with an 0.065" radial thickness of polythene. In this case the conductors of the high frequency pairs are 26 S.W.G. plain copper each sheathed with polythene having a radial thickness such that the twisted pair has a characteristic impedance of approximately 140 ohms. The average attenuation of a high frequency pair of such a cable in which the high frequency pairs are formed of 20 S.W.G. plain copper is about 9 db per 1,000 feet at 10 mc./s. and the corresponding figure in respect of a high frequency pair formed from 26 S.W.G. plain copper is approximately 14 db.

In the alternative embodiment shown in FIG. 3 six high frequency pairs, 33 . . . 38, are arranged as a symmetrical compact group around a central core element which comprises a pair of twisted together insulated conductors 39. This twisted centre pair has a circumscribing cylinder of the same diameter as the circumscribing cylinder pertaining to each of the six high frequency pairs and can, in fact, be of the same construction as such a high frequency pair. However because of its location it is preferred not to use this centre pair for the transmission of high frequency signals, but to reserve it for the transmission of audio frequency signals.

According to this embodiment of the invention one at least of the six high frequency pairs has associated therewith the conductors of an audio frequency pair. Thus, as shown in the drawing, alternate pairs 34, 36 and 38 of the six high frequency pairs have additional conductors 40 arranged in their interstices and these additional conductors constitute a twisted pair suitable for the transmission of audio frequency signals. Although as indicated on the drawing the conductors 40 are provided with a sheath 41 of insulating material, for example enamel, bare conductors can be used. However if adjacent high frequency pairs are provided with the additional audio frequency pairs, insulation of the conductors of the latter pairs would be necessary. The diameter of the conductors 40 (including their insulation if any) is preferably not greater than two thirds of the diameter of the insulated conductors forming the associated high frequency pair so that the additional pair do not extend beyond the confines of the circumscribing cylinder of the high frequency pair. The compact assembly is wrapped with a layer 42 of polyethylene terephthalate strip and this wrapped assembly is enclosed within a polythene sheath 43. A screen may be provided in some cases.

In a modified arrangement of the cable shown in FIG. 3 the centre core element 39 is replaced by a centre core element of the kind shown in FIG. 2, namely a twisted group comprising three audio frequency pairs, thereby providing a separate line for each of six television programmes and each of six sound programmes.

In other arrangements the centre core element 39 of the cable shown in FIG. 3 can be replaced by a core string of solid dielectric material such as polythene.

In cases where the dimensions quoted have been related to a circumscribing cylinder it is to be understood that some slight variation in these dimensions may be necessary in order to provide for manufacturing tolerances.

What we claim is:

1. A wired broadcasting system comprising transmitting means for transmitting a plurality of high frequency signals corresponding to different television picture programs and a plurality of audio frequency signals corresponding to different sound programs, a plurality of subscriber receiver means for receiving the television picture signals and the audio frequency signals transmitted by said transmitting means and a signal distributing network connecting said transmitting means with each of said subscriber receiver means for transmitting the signals transmitted by said transmitting means to each of said subscriber receiver means, said signal distributing network including a signal transmitting cable comprising a central core element having a circumscribing cylinder, six pairs of insulated high frequency conductors each having a circumscribing cylinder having a diameter equal to that of said central core element, said pairs of high frequency conductors being positioned around said central core in a manner whereby the circumscribing cylinder of each of said pairs of high frequency conductors contacts the circumscribing cylinder of each adjacent pair of high frequency conductors and the circumscribing cylinder of said central core element, each of said pairs of high frequency conductors comprising a pair of conductors twisted together at a pitch different from that of the others, the conductors of each pair of high frequency conductors forming a pair of interstices therebetween, and at least three pairs of insulated audio frequency conductors, each of said pairs of audio frequency conductors being associated with a corresponding one of said pairs of high frequency conductors, each of said pairs of audio frequency conductors comprising a pair of conductors each positioned in a corresponding one of the pair of interstices of the pair of high frequency conductors with which said pair of conductors is associated, each conductor of each of said pairs of audio frequency conductors having a diameter which is two thirds the diameter of each conductor of each of said pairs of high frequency conductors whereby each of the interstices of said pairs of high frequency conductors associated with said pairs of audio frequency conductors is completely filled by the audio frqeuency conductor positioned therein.

2. A wired broadcasting system as claimed in claim 1, wherein said central core element comprises a pair of insulated conductors twisted together at a pitch different from that of any of said pairs of high frequency conductors, the pair of conductors of said central core element having diameters sufficient to fully occupy the circumscribing cylinder of said central core element.

3. A wired broadcasting system as claimed in claim 1, wherein said central core element comprises three pairs of audio frequency conductors spiralled along the length of said signal transmitting cable, the conductors of each of said pairs of audio frequency conductors being twisted together at a pitch different from that of the others, the pairs of audio frequency conductors having diameters sufficient to fully occupy the circumscribing cylinder of said central core element.

4. A wired broadcasting system as claimed in claim 1, wherein each of six pairs of audio frequency conductors is associated with a corresponding one of each of said pairs of high frequency conductors, each of said pairs of audio frequency conductors comprising a pair of conductors each positioned in a corresponding one of the pair of interstices of the pair of high frequency conductors with which said pair of conductors is associated, each conductor of each of said pairs of audio frequency conductors having a diameter which is two thirds the diameter of each conductor of each of said pairs of high frequency conductors whereby each of the interstices of said pairs of high frequency conductors associated with said pairs of audio frequency conductors is completely filled by the audio frequency conductor positioned therein.

References Cited

UNITED STATES PATENTS

| | | | |
|---|---|---|---|
| 1,856,204 | 5/1932 | Affel et al. | 333—12 |
| 1,978,419 | 10/1934 | Dudley | 333—12 |
| 2,180,731 | 11/1939 | Dickinson | 333—12 |
| 2,243,851 | 6/1941 | Booth et al. | 333—12 |
| 2,245,492 | 6/1941 | Meyer | 333—12 |
| 2,996,580 | 8/1961 | Reid | 179—.1 |

KATHLEEN H. CLAFFY, *Primary Examiner.*

A. H. GESS, *Assistant Examiner.*